US012352187B2

(12) United States Patent
Guo

(10) Patent No.: US 12,352,187 B2
(45) Date of Patent: Jul. 8, 2025

(54) CAMSHAFT CARRIER FOR SUPPORTING A CAMSHAFT, AN ENGINE SYSTEM, AND A METHOD OF ASSEMBLY

(71) Applicant: CUMMINS INC., Columbus, IN (US)

(72) Inventor: Xiang Guo, Wuhan (CN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/642,965

(22) Filed: Apr. 23, 2024

(65) Prior Publication Data

US 2024/0360776 A1 Oct. 31, 2024

(30) Foreign Application Priority Data

Apr. 28, 2023 (CN) ......................... 202310491130.9

(51) Int. Cl.
*F01L 1/053* (2006.01)
*F02F 1/24* (2006.01)
*F02F 1/42* (2006.01)

(52) U.S. Cl.
CPC .............. *F01L 1/053* (2013.01); *F02F 1/242* (2013.01); *F02F 1/4285* (2013.01)

(58) Field of Classification Search
CPC ... F01L 1/053; F01L 2001/0537; F01L 1/185; F01L 2001/0476; F02F 1/242; F02F 1/4285; F02M 61/14
See application file for complete search history.

(56) References Cited

U.S. PATENT DOCUMENTS

| | | | | |
|---|---|---|---|---|
| 5,213,071 A * | 5/1993 | Iwata | F01L 1/26 | 123/193.5 |
| 5,385,125 A * | 1/1995 | Oyaizu | F01L 1/026 | 123/90.31 |
| 5,806,499 A * | 9/1998 | Stover | F01L 1/18 | 123/90.27 |
| 9,453,436 B2 | 9/2016 | Graham | | |
| 2016/0177868 A1* | 6/2016 | Wicks | F02F 7/006 | 123/90.6 |

FOREIGN PATENT DOCUMENTS

| | | | | |
|---|---|---|---|---|
| CN | 204552855 U | * 8/2015 | | |
| CN | 104989546 A | * 10/2015 | F01M 9/10 | |
| CN | 205117430 U | * 3/2016 | | |
| CN | 206016884 U | * 3/2017 | | |
| CN | 107869403 A | * 4/2018 | F01L 1/047 | |

(Continued)

OTHER PUBLICATIONS

EP Search Report for EP Application No. 24171056.5, dated Sep. 27, 2024.

*Primary Examiner* — Hung Q Nguyen
(74) *Attorney, Agent, or Firm* — Foley & Lardner LLP

(57) ABSTRACT

The application relates to a camshaft carrier for supporting a camshaft, an engine system, and a method of assembly. An engine system includes a cylinder block, a cylinder head, a camshaft carrier, a camshaft, and a fuel injector assembly. The cylinder head is coupled to the cylinder block and defines at least one of an inlet passage or an exhaust passage therein. The camshaft carrier is coupled to the cylinder head and the camshaft is coupled to the camshaft carrier. The fuel injector assembly is coupled to the camshaft carrier and extends through a carrier sidewall of the camshaft carrier.

19 Claims, 5 Drawing Sheets

(56) References Cited

FOREIGN PATENT DOCUMENTS

| | | | | | |
|---|---|---|---|---|---|
| CN | 109339966 | A | * | 2/2019 | ................ F02F 1/24 |
| CN | 109404155 | A | * | 3/2019 | ................ F02F 1/24 |
| CN | 109415996 | A | * | 3/2019 | ............. F01M 9/102 |
| CN | 110388295 | A | | 10/2019 | |
| CN | 113323767 | A | * | 8/2021 | |
| DE | 10 2010 009 687 | A1 | | 10/2010 | |
| DE | 102011111580 | A1 | * | 2/2013 | .............. F01L 1/047 |
| DE | 10 2015 105 848 | A1 | | 4/2016 | |
| EP | 0 458 341 | A1 | | 11/1991 | |
| EP | 1728976 | A1 | * | 12/2006 | .............. F01L 1/053 |
| JP | S60216011 | A | * | 10/1985 | |
| JP | H11324865 | A | * | 11/1999 | ................ F02F 1/38 |
| JP | 2001-295736 | A | | 10/2001 | |
| JP | 2005-180277 | A | | 7/2005 | |
| KR | 2010133781 | A | * | 12/2010 | .............. F01L 1/053 |
| WO | WO-99/35393 | A1 | | 7/1999 | |
| WO | WO-2007083222 | A1 | * | 7/2007 | .............. F01L 1/053 |
| WO | WO-2007083223 | A1 | * | 7/2007 | .............. F01L 1/053 |
| WO | WO-2012115123 | A1 | * | 8/2012 | .............. F02F 7/006 |

* cited by examiner

CAMSHAFT CARRIER FOR SUPPORTING A CAMSHAFT, AN ENGINE SYSTEM, AND A METHOD OF ASSEMBLY

CROSS-REFERENCE TO RELATED APPLICATIONS

This application claims priority to and the benefit of Chinese Patent Application No. 202310491130.9, filed on Apr. 28, 2023, the content of which is herein incorporated by reference.

TECHNICAL FIELD

The present disclosure relates generally to camshaft and cylinder head assembly designs for internal combustion engine systems.

BACKGROUND

Internal combustion engine systems can include a camshaft to control operation of intake and exhaust valves during the combustion process. The camshaft can engage with a rocker arm or lever which converts rotation of the camshaft to linear movement of the valve(s) to move the valve(s) during engine operation. The camshaft can be located adjacent to, or within, a cylinder block (e.g., engine block, etc.) of the engine, or within a cylinder head of the engine, such as in overhead camshaft engine arrangements.

Internal combustion engine systems can also include fuel injectors configured to introduce fuel into a combustion cylinder of the engine, and wire harnesses to electrically couple or otherwise interface various engine sensors with a control unit of the internal combustion engine system. The fuel injectors and/or wire harnesses can be engaged with and mounted to a cylinder head and/or a valve cover that encloses the cylinder head. The valve cover can prevent ingestion of dirt and other debris into the engine system and can also contain any oil vapor or mist that escapes from the cylinders into the cylinder head. The valve cover can be removed from the cylinder head during servicing to facilitate inspection of the camshaft and/or other components of the internal combustion engine.

SUMMARY

One embodiment relates to an engine system. The engine system includes a cylinder block, a cylinder head, a camshaft carrier, a camshaft, and a fuel injector assembly. The cylinder head is coupled to the cylinder block and defines at least one of an inlet passage or an exhaust passage therein. The camshaft carrier is coupled to the cylinder head. The camshaft is coupled to the camshaft carrier. The fuel injector assembly is coupled to the camshaft carrier. A portion of the fuel injector assembly extends through a carrier sidewall of the camshaft carrier.

In some embodiments, the camshaft carrier comprises a plurality of cam saddles, the camshaft rotatably coupled to the plurality of cam saddles so as to enable rotation of the camshaft within the camshaft carrier.

In some embodiments, the engine system further comprises a support sleeve coupled to and extending away from the carrier sidewall, the support sleeve separating regions disposed axially between the plurality of cam saddles from the cylinder head.

In some embodiments, the carrier sidewall defines: a first camshaft opening extending therethrough for viewing a first camshaft end of the camshaft, and a second camshaft opening extending therethrough for viewing a second camshaft end of the camshaft opposite the first camshaft end.

In some embodiments, the cylinder head includes a cylinder head sidewall, the carrier sidewall fastened to the cylinder head sidewall.

In some embodiments, an average thickness of the carrier sidewall is less than an average thickness of the cylinder head sidewall.

In some embodiments, the carrier sidewall defines an interior cavity of the camshaft carrier, the camshaft carrier further comprising a plurality of rocker arms fastened to the camshaft carrier and disposed within the interior cavity.

In some embodiments, the engine system further comprises at least one wire harness coupled to the camshaft carrier, a portion of the at least one wire harness extending through the carrier sidewall of the camshaft carrier.

In some embodiments, the engine system further comprises a valve cover fastened to the camshaft carrier, the camshaft carrier disposed between and separating the valve cover from the cylinder head.

In some embodiments, the cylinder head includes an intake side and an exhaust side opposite the intake side, the cylinder head defining the inlet passage extending through the intake side of the cylinder head, the fuel injector assembly coupled to the camshaft carrier adjacent to the intake side of the cylinder head.

In some embodiments, the camshaft carrier is engaged with and extends across a substantially planar surface of the cylinder head.

Another embodiment relates to a camshaft carrier for supporting a camshaft on an engine. The camshaft carrier includes a carrier sidewall and a plurality of cam saddles. The carrier sidewall defines an interior cavity and a plurality of injector mounts. The plurality of injector mounts each include an opening that is configured to receive a portion of a fuel injector assembly therethrough and a fuel injector connector configured to couple the fuel injector assembly to the carrier sidewall. The plurality of cam saddles are coupled to the carrier sidewall within the interior cavity. The plurality of cam saddles are configured to support the camshaft.

Another embodiment relates to a camshaft carrier for supporting a camshaft on an engine, the camshaft carrier comprising: a carrier sidewall defining an interior cavity, the carrier sidewall defining a plurality of injector mounts, the plurality of injector mounts each comprising: an injector mount opening configured to receive a portion of a fuel injector assembly therethrough, and a fuel injector connector configured to couple the fuel injector assembly to the carrier sidewall; and a plurality of cam saddles coupled to the carrier sidewall and disposed within the interior cavity, the plurality of cam saddles configured to support the camshaft.

In some embodiments, each of the plurality of cam saddles extend between a first sidewall portion of the carrier sidewall and a second sidewall portion of the carrier sidewall that is spaced apart from the first sidewall portion, the plurality of cam saddles defining bores that are coaxially aligned with one another.

In some embodiments, the camshaft carrier further comprises a plurality of support struts, each of the plurality of support struts engaged with and extending away from a respective one of the plurality of cam saddles to the carrier sidewall.

In some embodiments, the plurality of support struts define a plurality of through-hole openings, the plurality of through-hole openings each configured to receive a cylinder head fastener therethrough.

In some embodiments, the camshaft carrier further comprises a support sleeve extending axially between adjacent cam saddles of the plurality of cam saddles, the support sleeve coaxially aligned with the plurality of cam saddles.

In some embodiments, the carrier sidewall defines a forward camshaft opening and a rear camshaft opening, the forward camshaft opening and the rear camshaft opening extending through the carrier sidewall, the forward camshaft opening and the rear camshaft opening coaxially aligned with the plurality of cam saddles.

In some embodiments, the camshaft carrier further comprises a plurality of rocker support tabs, at least one rocker support tabs of the plurality of rocker support tabs defining a rocker mount opening configured to couple a rocker arm to the camshaft carrier.

In some embodiments, the carrier sidewall and the plurality of cam saddles are integrally formed from a single piece of material.

Yet another embodiment relates to a method of assembly for an internal combustion engine. The method includes (i) coupling a camshaft carrier to a cylinder head of the engine, where the cylinder head defines an inlet passage or an exhaust passage therein, (ii) coupling a camshaft to the camshaft carrier so that the camshaft is disposed substantially within an internal cavity of the camshaft carrier, and (iii) coupling a portion of a fuel injector assembly to the camshaft carrier by inserting a fuel injector of the fuel injector assembly through an opening in a carrier sidewall of the camshaft carrier, and fastening the fuel injector assembly to the camshaft carrier.

Yet another embodiment relates to a method of assembly for an internal combustion engine, comprising: coupling a camshaft carrier to a cylinder head of the engine, the cylinder head defining at least one of an inlet passage or an exhaust passage therein; coupling a camshaft to the camshaft carrier so that the camshaft is disposed substantially within an interior cavity of the camshaft carrier; and coupling a fuel injector assembly to the camshaft carrier by inserting a portion of the fuel injector assembly through an opening in a carrier sidewall of the camshaft carrier, and fastening the fuel injector assembly to the camshaft carrier.

In some embodiments, coupling the camshaft carrier to the cylinder head comprises engaging a first carrier end of the camshaft carrier with a substantially planar surface of the cylinder head and fastening the carrier sidewall to the cylinder head along a perimeter of the carrier sidewall, the method further comprising coupling a valve cover to a second carrier end of the camshaft carrier opposite the first carrier end.

Figure 1B:
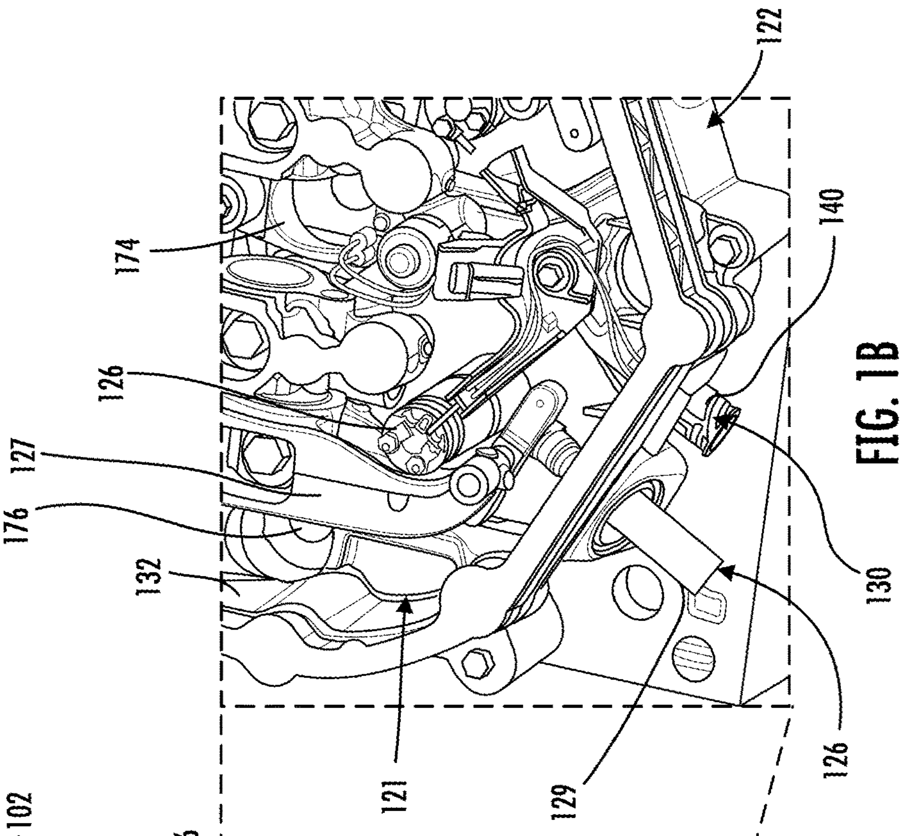
FIG. 1B is a perspective view of a fuel injector and wire harness receiving portion of the internal combustion engine of FIG. 1A.

It will be recognized that the Figures are schematic representations for purposes of illustration. The Figure are provided for the purpose of illustrating one or more implementations with the explicit understanding that the Figures will not be used to limit the scope or the meaning of the claims.

DETAILED DESCRIPTION OF EMBODIMENTS

Following below are more detailed descriptions of various concepts related to, and implementations of, a camshaft carrier structure for an internal combustion engine. The various concepts introduced above and discussed in greater detail below may be implemented in various ways, as the described concepts are not limited to any particular manner of implementation. Examples of specific implementations and applications are provided primarily for illustrative purposes.

Embodiments described herein relate generally to camshaft carrier structures for an internal combustion engine that can house and secure a camshaft, fuel injector assemblies, and/or wire harnesses to the internal combustion engine. The camshaft carrier structures can also house and secure rocker levers that are used to transmit forces between the camshaft and inlet/exhaust valves to the internal combustion engine. The camshaft carriers can include mounting interfaces for each of these components and can be coupled to a cylinder head of the engine that is used to direct air and fuel into combustion cylinders of the internal combustion engine. By separating these components from the cylinder head and/or cylinder block, the size and complexity of the cylinder head and/or cylinder block can be reduced. For example, the camshaft carrier structures described herein can eliminate supporting hardware from the cylinder head and/or the cylinder block that would otherwise be needed to support these components. Additionally, because different forces act on the camshaft carrier as compared to the cylinder head, lighter and/or thinner materials can be used for the camshaft carrier. In some embodiments, the camshaft carrier can be formed from an aluminum alloy that can be more easily machined as compared to iron alloys and other higher strength materials.

The camshaft carriers described herein can also improve modularity of an internal combustion engine. For example, the internal combustion engine can be designed to use similar cylinder head designs, with fewer design differences between engine platforms. The cylinder heads can be configured to engage with different camshaft carrier designs depending on the desired engine arrangement. For example, the camshaft carriers can include a single camshaft (e.g., for a single overhead camshaft (SOHC) engine arrangement) or multiple camshafts (e.g., for a dual overhead camshaft (DOHC) arrangement, etc.).

The camshaft carrier structures described herein can also simplify servicing of the internal combustion engine during maintenance intervals. For example, the camshaft carriers can eliminate the need to disassemble or otherwise remove the fuel injectors and/or wire harnesses from the cylinder head or valve cover when disassembling the engine to check valve timing, valve lash, and/or to service other parts of the cylinder head. The camshaft carriers can also reduce the risk oil leakage by avoiding removal of the fuel injectors during servicing and/or by enabling removal of the fuel injectors with the camshaft carrier without unseating the fuel injectors from their respective mounts on the internal combustion engine.

Figure 1A:
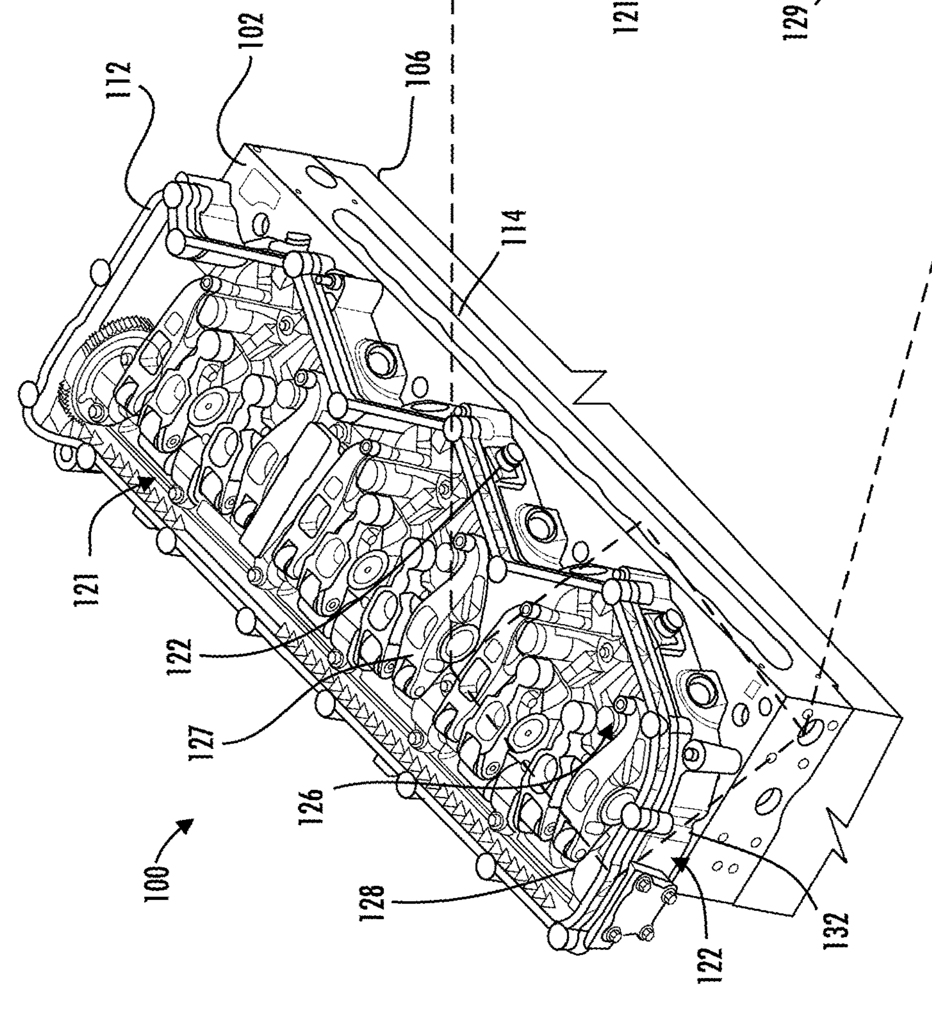
FIG. 1A is a perspective cross-sectional view of a cylinder head portion of an internal combustion engine, according to an embodiment.

Referring to FIGS. 1A-1B, an engine system is shown as engine 100, according to an embodiment. The engine 100 includes a cylinder block 106, a cylinder head 102 coupled to the cylinder block 106 and defining at least one of an inlet passage 114 or an exhaust passage therein. The engine 100 also includes a camshaft carrier 122 coupled to the cylinder head 102 and a camshaft 128 coupled to the camshaft carrier 122. The engine further includes a fuel injector assembly 126 coupled to the camshaft carrier 122. A portion 129 of the fuel injector assembly 126 extends through a carrier sidewall 132 of the camshaft carrier 122.

In other embodiments, the engine 100 may include additional, fewer, and/or different components. For example, the engine 100 may include a valve cover 112 coupled to the camshaft carrier 122, and/or components to facilitate sealing between the camshaft carrier 122, the cylinder head 102, and the valve cover 112.

The cylinder block 106 (e.g., an engine block, etc.) includes cylinders (not shown) for receiving fuel and air to power the engine 100. In some embodiments, the engine 100 is an inline engine having the cylinders arranged in a row along the cylinder block 106. In other embodiments, the cylinder block 106 defines cylinders arranged in pairs on either side of the cylinder block 106 in a V-type engine configuration. It should be understood that the embodiments of the present disclosure are not limited to a single engine block configuration/design. In some embodiments, the engine 100 is a diesel engine. In various alternative embodiments, the engine 100 is one of a gasoline engine, a natural gas engine, a dual fuel engine, a biodiesel engine, an E85 engine, a flex fuel engine, or another type of internal combustion engine or driver. The engine 100 can be used to power a tractor, a flatbed truck, a dump truck, a mixer vehicle, or another on or off highways vehicle. In some embodiments, the engine 100 can be used in an industrial application to drive a pump, a hydraulic system, or another type of system.

The cylinder head 102 is coupled to the cylinder block 106 and defines at least one of an inlet passage 114 (e.g., an intake passage, etc.) or an exhaust passage therein (i.e., an inlet passage 114 and/or an exhaust passage). The cylinder head 102 is configured to direct fuel and air into the cylinders of the engine to power the engine 100.

Figure 2:
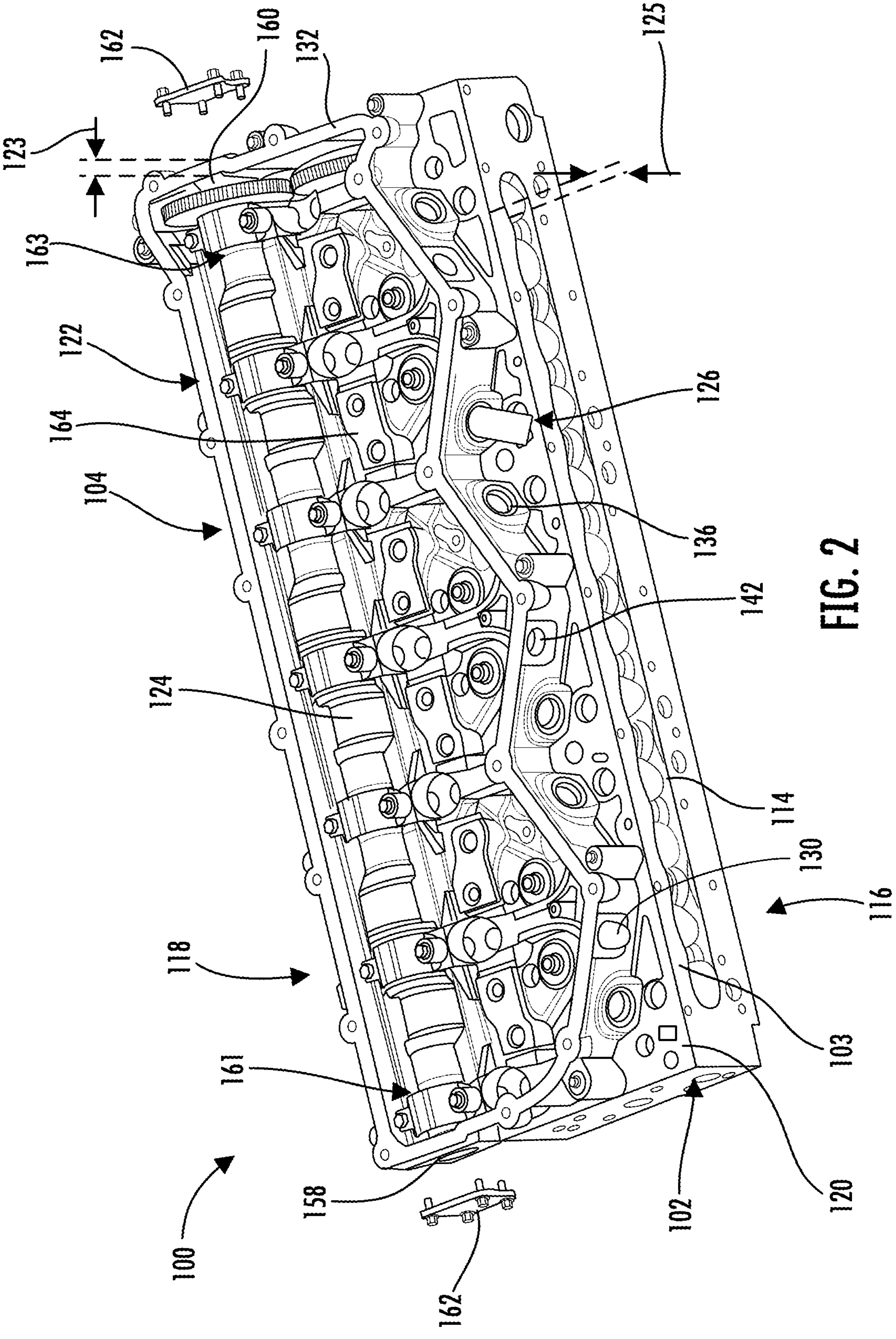
FIG. 2 is a partially exploded perspective view of a cylinder head portion of the internal combustion engine of FIG. 1A.

FIG. 2 shows an exploded view of the cylinder head 102 and camshaft carrier assembly 104 of FIGS. 1A-1B. The cylinder head 102 includes an intake side 116 and an exhaust side 118 disposed on an opposite end of the cylinder head 102 as the intake side 116. The cylinder head 102 defines the inlet passage 114 extending through the intake side 116 of the cylinder head 102. In some embodiments, the inlet passage 114 includes a channel that is fluidly coupled to an intake valve for each combustion cylinder. In other embodiments, the inlet passage 114 includes a plurality of flow passages that extend between an intake manifold and the intake valves. In some embodiments, the cylinder head 102 defines the exhaust passage extending through the exhaust side 118 of the cylinder head 102, which can have a similar or different geometry from the inlet passage 114.

The cylinder head 102 can be cast or otherwise formed from an iron material (e.g., an iron-carbon alloy, etc.) as a single monolithic piece, and can be machined to form various passages, mounting and/or support surfaces in the cylinder head 102. The cylinder head 102 includes a cylinder head sidewall 103 that defines various passages in the cylinder head 102 (e.g., the inlet passage 114). In some embodiments, the carrier sidewall 132 is fastened to the cylinder head sidewall 103. The cylinder head 102 (e.g., the cylinder head sidewall 103) defines a substantially planar mounting surface 120 (e.g., upper surface, carrier support surface, etc.) that extends between the intake side 116 and the exhaust side 118. In various embodiments, the cylinder head 102 defines fastener openings, seal grooves, oil flow passages, and/or other geometry to facilitate engagement between the cylinder head 102 and the camshaft carrier assembly 104.

In some embodiments, the camshaft carrier 122 forms part of a camshaft carrier assembly 104 that is configured to support various engine equipment. The camshaft carrier assembly 104 is coupled to the mounting surface 120 of the cylinder head 102 (e.g., the cylinder head sidewall 103) and extends away from the mounting surface 120. In some embodiments, the camshaft carrier assembly 104 is disposed between the cylinder head 102 and the valve cover 112 and separates the cylinder head 102 from the valve cover 112. In other embodiments, the engine 100 includes additional component(s) separating the camshaft carrier assembly 104 from the cylinder head 102 and/or the valve cover 112.

In some embodiments, the camshaft carrier assembly 104 includes the camshaft carrier 122, the camshaft 124, a plurality of fuel injector assemblies 126, a plurality of rocker arms 127, and a plurality of wire harnesses 130. In other embodiments, the camshaft carrier assembly 104 can include additional, fewer, and/or different components.

Figure 3:
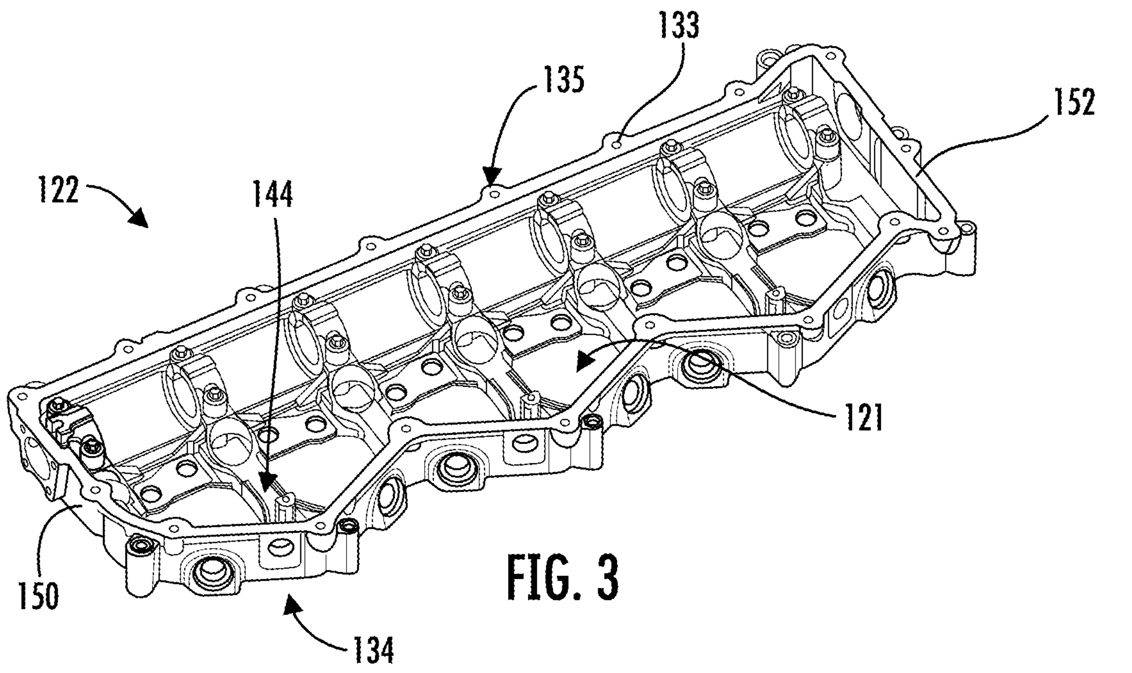
FIG. 3 is a top perspective view of a camshaft carrier of the internal combustion engine of FIG. 1A.
Figure 4:
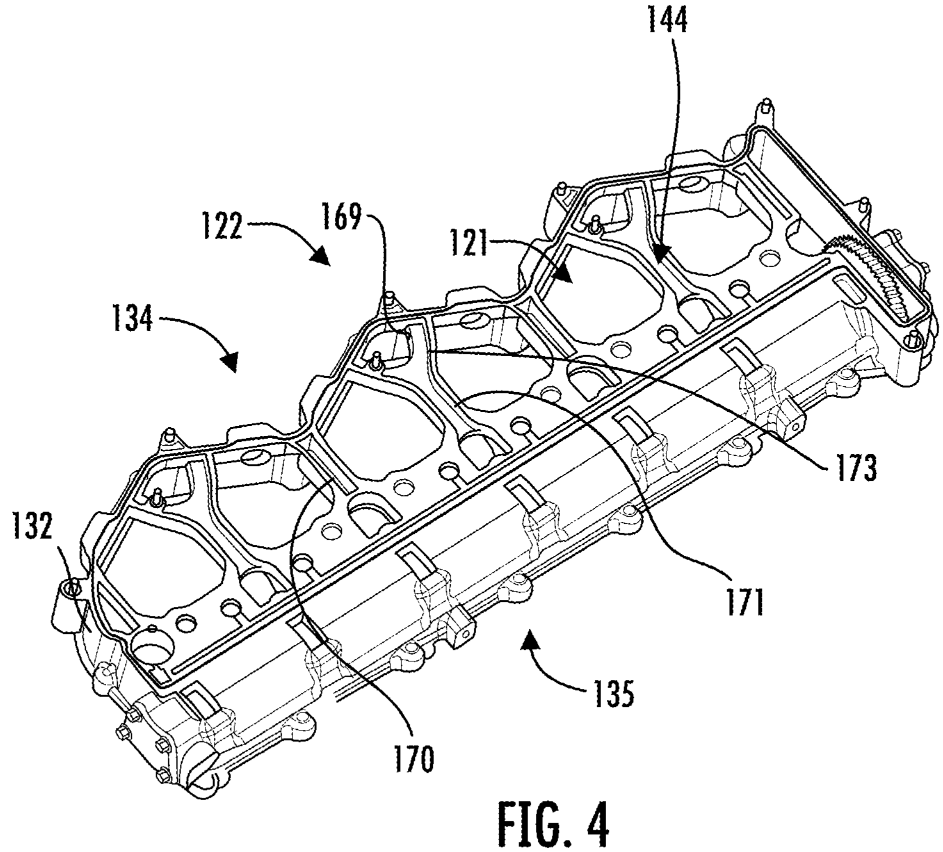
FIG. 4 is a bottom perspective view of the camshaft carrier of the internal combustion engine of FIG. 1A.
Figure 5:
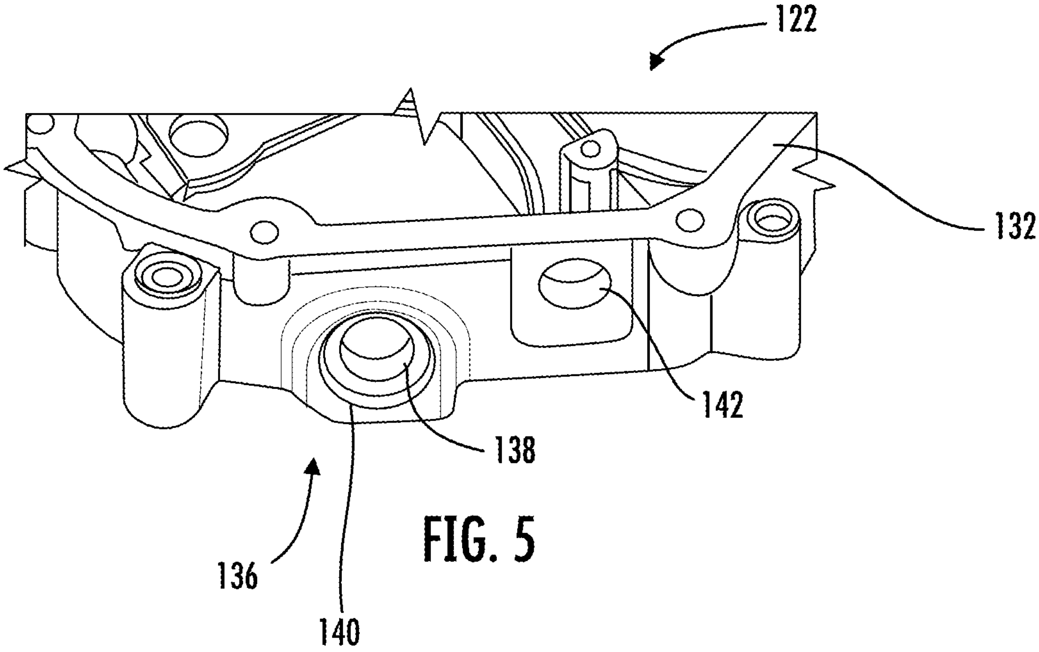
FIG. 5 is a top perspective view of a camshaft receiving portion of the camshaft carrier of FIG. 3.

Referring to FIGS. 3-4, an example camshaft carrier 122 for supporting a camshaft on an engine (e.g., the camshaft 124 and the engine 100 of FIGS. 1A-1B and 2) is shown. The camshaft carrier 122 includes a carrier sidewall 132 defining an interior cavity 121. Referring to FIG. 5, the carrier sidewall defines a plurality of injector mounts 136. The plurality of injector mounts 136 each include an injector mount opening 138 configured to receive a portion 129 of a fuel injector assembly 126 therethrough (see FIG. 1B). Each of the plurality of injector mounts 136 also includes a fuel injector connector 140 (see FIG. 1B) configured to couple the fuel injector assembly 126 to the carrier sidewall 132. The camshaft carrier 122 further includes a plurality of cam saddles 146. The plurality of cam saddles 146 are coupled to the carrier sidewall 132 and are disposed within the interior cavity 121. The plurality of cam saddles 146 are configured to support the camshaft 124.

The camshaft carrier 122 is configured to house and support the various engine equipment, and to separate the engine equipment from the cylinder head 102. The camshaft carrier 122 is coupled to and sealingly engaged with the cylinder head 102. In some embodiments, the camshaft carrier 122 is engaged with and extends across the mounting surface 120 of the cylinder head 102. In some embodiments, the camshaft carrier 122 is fastened directly to the mounting surface 120 of the cylinder head 102 via bolts or another suitable fastener.

Referring to FIGS. 3-4, the carrier sidewall 132 extends along a perimeter of the mounting surface 120 of the cylinder head 102 (see FIG. 2). The carrier sidewall 132 is engaged with the mounting surface 120 at a first carrier end 134 of the camshaft carrier 122 and extends away from the mounting surface 120 in a substantially perpendicular orientation relative to the mounting surface 120 (see FIG. 2). In some embodiments, the carrier sidewall 132 defines a first carrier mounting flange at the first carrier end 134 that is configured to sealingly engage with the mounting surface

120 of the cylinder head 102 (e.g., via a gasket, or another suitable seal member). The carrier sidewall 132 also includes a second carrier mounting flange at a second carrier end 135 that is configured to sealingly engage the camshaft carrier 122 to the valve cover 112 or another engine component (see FIG. 1A).

In some embodiments, the carrier sidewall 132 fastens the camshaft carrier assembly 104 to the cylinder head 102 and/or the valve cover 112. As shown in FIG. 3, the carrier sidewall 132 includes a plurality of fastener openings 133 extending therethrough between the first carrier end 134 and the second carrier end 135. The fastener openings 133 are spaced in approximately equal intervals along an outer perimeter of the camshaft carrier 122, and are configured to receive a bolt or other fastener therein to couple the camshaft carrier 122 to the cylinder head 102 and/or the valve cover 112 (see FIG. 1A).

In some embodiments, the camshaft carrier 122 is formed from a different material as the cylinder head 102. For example, the camshaft carrier 122 can be cast or otherwise formed from an aluminum material (e.g., an aluminum alloy such as 319 aluminum, A356 aluminum, A357 aluminum, etc.).

As shown in FIG. 2, due to the reduce loads applied to the camshaft carrier 122 during operation (e.g., relative to the cylinder head 102), an average thickness 123 of the carrier sidewall 132 is less than an average thickness 125 of the cylinder head sidewall 103. In some embodiments, the average thickness 123 of the carrier sidewall 132 is less than or equal to approximately ⅔ of the average thickness 125 of the cylinder head sidewall 103 (e.g., the average thickness 123 of the carrier sidewall 132 can be 4 mm and the average thickness 125 of the cylinder head sidewall 103 can be 6 mm, etc.). Using different materials and thicknesses for the camshaft carrier 122 and the cylinder head 102 can reduce the overall weight of the engine and associated manufacturing costs. For example, in certain applications the camshaft carrier 122 structure can reduce the overall weight of the engine within a range between approximately 10 kg to 28 kg (e.g., 18 kg, etc.).

Additionally, an arrangement which includes a camshaft 124, fuel injector assemblies 126, and rocker arms 127 supported by a camshaft carrier 122 can reduce machining operations required to produce the cylinder head 102 (and reduce overall machining time due to the use of softer materials such as aluminum alloys for the camshaft carrier 122).

Referring again to FIGS. 1A-1B, and FIG. 2, the camshaft carrier 122 is configured to receive and support various components of the camshaft carrier assembly 104. As depicted in the embodiment of FIG. 2, the camshaft carrier 122 is configured to receive and support the plurality of fuel injector assemblies 126 (e.g., a plurality of fuel injectors) and the plurality of wire harnesses 130. The fuel injector assemblies 126 (e.g., the fuel injectors) are coupled to the camshaft carrier 122. A portion 129 of each fuel injector assembly 126 extends through the carrier sidewall 132 of the camshaft carrier 122. Similarly, at least one of the wire harnesses 130 are coupled to the camshaft carrier 122, and a portion of the at least one wire harness 130 extends through the carrier sidewall 132 of the camshaft carrier 122.

FIG. 5 shows a first sidewall portion of the carrier sidewall 132 (e.g., a first sidewall portion on an intake side 116 of the cylinder head 102 as shown in FIG. 2). The carrier sidewall 132 defines at least one injector mount 136 including an injector mount opening 138 configured to receive the portion 129 of a fuel injector assembly 126 therethrough. The portion 129 may be a fuel inlet line, a relief or fuel return line, or another part of the fuel injector assembly 126. As shown in FIG. 5, the injector mount opening 138 is a first transverse opening that extends through the carrier sidewall 132 such that the fuel injector assembly 126 is supported in a parallel orientation relative to the mounting surface 120. In other embodiments, the injector mount 136 is arranged to allow the fuel injector assembly 126 to seat at an angle and so that a tip of the fuel injector extends toward a respective one of the combustion cylinders in the engine block.

In some embodiments, the at least one injector mount 136 further includes a fuel injector connector 140 configured to couple the fuel injector assembly 126 to the carrier sidewall 132. The fuel injector connector 140 can include a slotted fitting, a clip, a threaded connection, or another type of connector to fixedly couple the fuel injector assembly 126 to the carrier sidewall 132. In some embodiments, the fuel injector assemblies 126 are coupled to the cylinder head by fasteners on the camshaft carrier 122.

As shown in FIG. 2, the carrier sidewall 132 supports the wire harnesses 130 in a similar manner as the fuel injector assemblies 126. The carrier sidewall 132 includes a second transverse opening, shown as harness mount opening 142 that extends through the carrier sidewall 132. The harness mount opening 142 is disposed adjacent to the injector mount opening 138. In some embodiments, the carrier sidewall 132 defines a plurality of harness mount openings 142 disposed in alternating arrangement with the plurality of injector mount openings 138 so that a first harness mount opening is spaced apart from a second harness mount opening by an individual one of the injector mount openings 138. In other embodiments, the location of the harness mount opening 142 along the carrier sidewall 132 is different.

The carrier sidewall 132 also includes a wire harness connector, such as a clip, threaded connector, or another type of connector, adjacent to the harness mount opening 142, to removably couple the wire harness 130 to the carrier sidewall 132. Among other benefits, positioning the injector mounts 136 and the wire harness mounts on the camshaft carrier 122 can eliminate the need to include separate mounting points on the cylinder head 102 and/or valve cover 112 (see FIGS. 1A-1B). Such an arrangement can also eliminate the need to remove the fuel injector assemblies 126 and the wire harnesses 130 from the cylinder head 102 and/or valve cover 112 during service events, which can reduce the tensile failure rate of the wire harnesses 130 that could otherwise occur as a result of high frequency teardown of the engine. Such an arrangement can also improve engine quality, and reduce the risk of oil leakage by simplifying the disassembly and assembly process and eliminating the need to unseal the fuel injectors from the camshaft carrier 122 while servicing the engine.

In some embodiments (see, e.g., FIG. 2), the injector mounts 136 and the harness mounts (e.g., the harness mount openings 142) are disposed on a first sidewall portion of the carrier sidewall 132 that faces an intake side 116 of the cylinder head 102 when the camshaft carrier 122 is installed onto the cylinder head 102. In other embodiments, the position of the injector mounts 136 and/or wire harness mounts along the carrier sidewall 132 can be different.

Referring again to FIGS. 3-4, the carrier sidewall 132 defines an interior cavity 121 of the camshaft carrier 122. The interior cavity 121 is configured to receive the various components of the camshaft carrier assembly 104 therein. For example, as shown in FIGS. 1A-1B, the camshaft carrier 122 further includes a plurality of rocker arms 127 fastened to the camshaft carrier 122 and disposed within the interior cavity 121. Referring to FIGS. 3-4, the camshaft carrier 122 includes a support structure 144 that is configured to couple the camshaft 124 and/or the rocker arms 127 to the camshaft carrier 122, and to retain the camshaft 124 and/or rocker arms 127 at least partially within the interior cavity 121 (see FIGS. 1A-1B).

Figure 6:
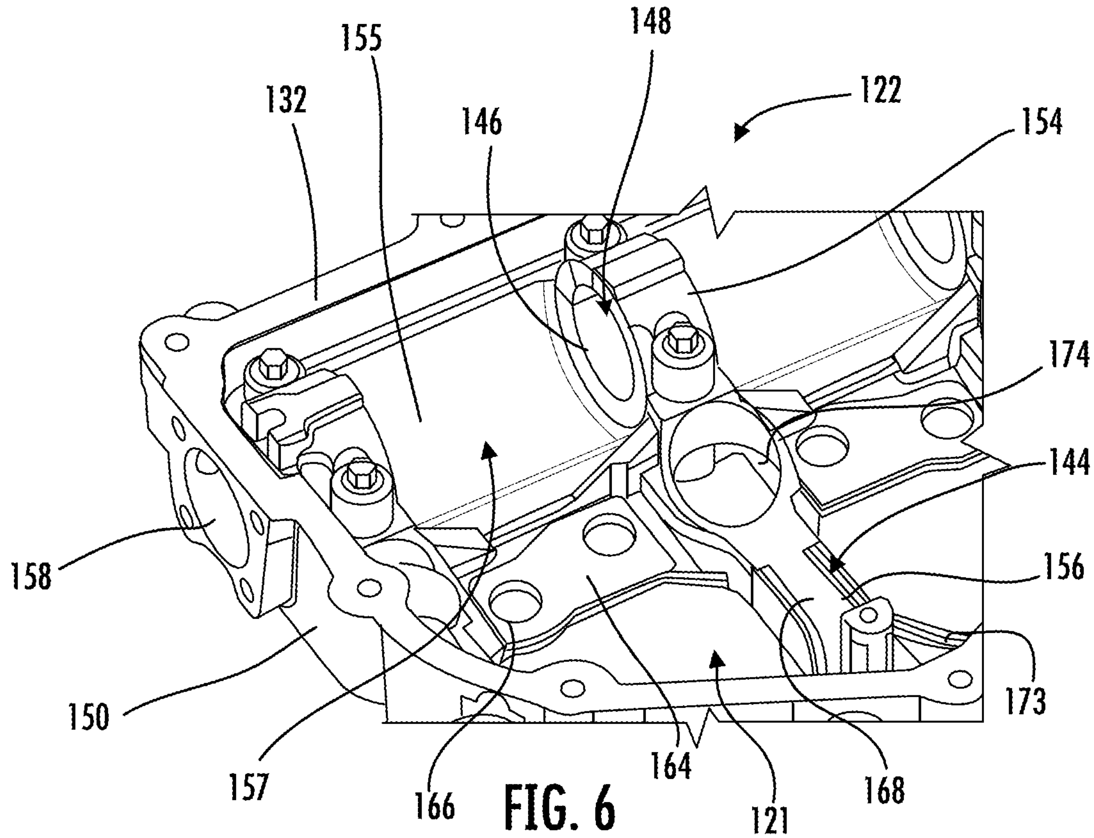
FIG. 6 is a top perspective view of a front portion of a carrier sidewall of the camshaft carrier of FIG. 3.

FIG. 6 shows a perspective view of a portion of the support structure 144 of the camshaft carrier 122. The camshaft carrier (e.g., the support structure 144) includes at least one cam saddle 146 coupled to the carrier sidewall 132 and disposed within the interior cavity 121. The cam saddle 146 is configured to support the camshaft 124 (see FIG. 2). The cam saddle 146 comprises a portion of a pillow-block type support for the camshaft 124. The cam saddle 146 includes a flange extending normal to the carrier sidewall 132 that defines a "C" shaped channel sized to receive a portion of the camshaft 124 therein. The "C" shaped channel defines a first half of a cam bore 148 that is configured to rotatably couple the camshaft 124 to the camshaft carrier 122.

In the embodiment depicted in FIG. 6, the camshaft carrier 122 includes a plurality of cam saddles 146. Each of the plurality of cam saddles 146 extends between a first sidewall portion 150 of the carrier sidewall 132 and a second sidewall portion 152 (see FIG. 3) of the carrier sidewall 132 that is spaced apart from the first sidewall portion 150. The plurality of cam saddles 146 define bores (e.g., a plurality of cam bores 148 as shown in FIG. 6) that are coaxially aligned with one another. The camshaft carrier 122 also includes a plurality of main bearing caps 154 that are configured to engage with the cam saddles 146 (e.g., to couple to the cam saddles 146 via bolts or another type of fastener). The camshaft carrier 122 and the main bearing caps 154 together are configured to retain bearings/bushings for the camshaft 124 to rotatably couple the camshaft 124 to the camshaft carrier 122 (see FIG. 2).

In the embodiment depicted in FIG. 6, the camshaft carrier 122 also includes at least one support sleeve 155 coupled to and extending away from the carrier sidewall 132 in regions 157 disposed axially between adjacent ones of the cam saddles 146. The support sleeve 155 couples adjacent ones of the plurality of cam saddles 146 together. The support sleeve 155 separates the regions 157 disposed axially between the plurality of cam saddles 146 from the cylinder head 102 (see FIG. 2). The support sleeve 155 also separates the camshaft 124 from the cylinder head 102 (see FIG. 2) when the camshaft carrier 122 is coupled to the cylinder head. As shown in FIG. 2, the support sleeve 155 is radially offset from the camshaft 124 and cam bores 148 and coaxially aligned with the plurality of cam saddles 146. The support sleeve 155 can improve the strength of the camshaft carrier 122 (e.g., the cam saddles 146) and can also direct any oil sling away from the camshaft 124 and toward other components in the interior cavity 121 (e.g., the rocker arms 127 shown in FIGS. 1A-1B, etc.).

Referring to FIG. 6, the camshaft carrier 122 also includes a plurality of support struts 156 configured to support the cam saddles 146 within the interior cavity 121. The plurality of support struts 156 can increase the strength of the camshaft carrier 122. In some embodiments, each of the support struts 156 is engaged with and extends away from a respective one of the plurality of cam saddles 146 to the carrier sidewall 132. In such an arrangement, the cam saddles 146 can be arranged normal to the carrier sidewall 132. In other embodiments, the arrangement of the support struts 156 is different.

In the embodiment depicted in FIG. 6, the plurality of cam saddles 146 each comprise a shaft 168 (e.g., a support beam, etc.) extending between the cam saddles 146 and the carrier sidewall 132. In other embodiments, the plurality of cam saddles 146 includes ribs, or another type of extension. The shaft(s) 168 are coupled to the support sleeve 155, the cam saddles 146, and/or the carrier sidewall 132. In some embodiments, at least one of the shafts 168 includes at least one forked end 173 defining a "Y" shaped extension where it engages the carrier sidewall 132, which can increase the strength of the camshaft carrier 122. In some embodiments, the forked end defines a through-hole opening 169 (see FIG. 4), which can facilitate access to portions of the cylinder head.

Referring to FIG. 4, each of the shafts 168 define a recessed area 170 (e.g., a slot, a groove, a hollow portion, a channel, a depression, etc.) on a first carrier end 134 of the camshaft carrier 122. The recessed areas 170 may extend along an entire length of the shaft 168 and through at least one end of the shaft 168. For example, referring to FIG. 4, the recessed areas 170 may form a channel 171 that extends through at least one end of the shaft 168. In other embodiments, at least one of the recessed areas 170 extends along only a portion of the shaft 168 (e.g., between opposing ends of the shaft 168). The channel 171 may include sidewalls that can provide additional structural support to the camshaft carrier 122. Incorporating recessed areas 170 into the shafts 168 can also reduce the overall weight of the camshaft carrier 122.

In some embodiments, as shown in FIG. 6, the support struts 156 define at least a portion of a plurality of through-hole openings 174 (e.g., holes, bores, etc.) between the support struts 156 and the cam saddles 146. In some embodiments, the through-hole openings 174 are at least partially defined by an elongated support element of the support structure 144. The elongated support element is disposed between the cam saddles 146 and the carrier sidewall 132. In some embodiments, the through-hole openings 174 are disposed at a central position within the interior cavity 121. In other embodiments, the through-hole openings 174 are disposed at a mid-point between opposing carrier sidewalls 132 or at different locations along the camshaft carrier 122.

In some embodiments, the through-hole openings 174 are configured to facilitate assembly of the cylinder head to the cylinder block. Referring to FIG. 6, the through-hole openings 174 are aligned or otherwise disposed at locations corresponding to fastener openings for the cylinder head. In the embodiment depicted in FIG. 6, the through-hole openings 174 are configured (e.g., sized, etc.) to receive a fastener therethrough (e.g., a cylinder head bolt fastener 176, etc.) to secure the cylinder head to the cylinder block. Such an arrangement of through-hole openings 174 can facilitate servicing events and tear down of the cylinder head. The through-hole openings 174 can also reduce the amount of material used, and the weight of, the camshaft carrier 122 while improving the overall strength of the camshaft carrier 122. In other embodiments, the camshaft carrier 122 may include additional through-hole openings 174 that are sized to receive portions of the rocker arm assemblies and/or other components therein.

In the embodiment depicted in FIG. 2, the cam saddles 146 are disposed on the exhaust side 118 of the cylinder head 102. Such an arrangement provides room for the fuel injector assemblies 126 and wire harnesses 130, and can improve the strength of the cam saddles 146 (by positioning the cam saddles 146 adjacent to the carrier sidewall 132). However, it should be understood that the position of the cam saddles 146 can be different in other embodiments, and could be disposed at any other location along the camshaft carrier 122. For example, in some embodiments, the camshaft carrier 122 is configured to support two camshafts in a dual overhead camshaft arrangement instead of a single camshaft. Such an arrangement-which includes a camshaft, fuel injector assemblies, and rocker arms supported in a separate structure from the cylinder head—can reduce the number of changes that need to be made to the design of the cylinder head for different engine platforms.

Referring again to FIG. 6 (see also FIG. 2), the carrier sidewall 132 is configured to facilitate access to the camshaft 124. The carrier sidewall 132 defines a plurality of camshaft openings arranged to facilitate inspection of the camshaft 124 from outside of the camshaft carrier 122. The carrier sidewall 132 includes a first camshaft opening 158 (e.g., a forward camshaft opening, etc.) extending therethrough for viewing a first camshaft end 161 of the camshaft 124. The carrier sidewall 132 also includes a second camshaft opening 160 (e.g., a rear camshaft opening, etc.) extending therethrough for viewing a second camshaft end 163 of the camshaft 124 opposite from the first camshaft end 161.

The first camshaft opening 158 and the second camshaft opening 160 extend through the carrier sidewall 132. The first camshaft opening 158 and the second camshaft opening 160 are disposed on opposite ends of the carrier sidewall 132 from one another. In the embodiment depicted in FIG. 2, the first camshaft opening 158 and the second camshaft opening 160 are coaxially aligned with the at least one cam saddle 146 to enable observation of respective ends of the camshaft 124 without disassembling the valve cover from the camshaft carrier 122.

In at least one embodiment, the camshaft carrier 122 includes access panels 162 removably coupled to the carrier sidewall 132 at the first camshaft opening 158 and the second camshaft opening 160, which can be removed from the carrier sidewall 132 to observe, for example, camshaft timing and/or the cam gear assembly that connects the camshaft 124 to the timing chain. In some embodiments, the access panels 162 are bolted to the carrier sidewall 132. In other embodiments, the access panels 162 are clipped or otherwise fastened to the carrier sidewall 132.

In some embodiments (see FIG. 2), the camshaft carrier 122 is configured to support rocker arms (e.g., rocker levers, rockers, etc.) 127 and/or rocker arm assemblies within the interior cavity 121. Referring to FIG. 6, the camshaft carrier 122 includes a plurality of rocker support tabs 164 configured to fixedly couple portions of the rocker arm assembly to the camshaft carrier 122. The rocker support tabs 164 are elongated tabs/panels that are arranged substantially parallel to the mounting surface 120 of the cylinder head 102 (see FIG. 2). The rocker support tabs 164 each define at least one rocker mount opening 166 (e.g., thrust holes, etc.) extending therethrough that are configured to receive bolts or another type of fastener for the rocker arm assemblies.

In the embodiment depicted in FIG. 6, the rocker support tabs 164 are disposed adjacent to the support sleeve 155 in the regions 157 between the cam saddles 146. In other embodiments, the rocker support tabs 164 can be disposed at a different location within the interior cavity 121.

In some embodiments, the carrier sidewall 132, the cam saddles 146, the rocker support tabs 164, and the support structure 144 are cast or otherwise integrally formed from as a monolithic structure from a single piece of material. In other embodiments, at least one of the cam saddles 146, the rocker support tabs 164, and the support structure 144 are formed separately from the carrier sidewall 132 and are welded, fastened, or otherwise coupled to the carrier sidewall 132.

Figure 7:
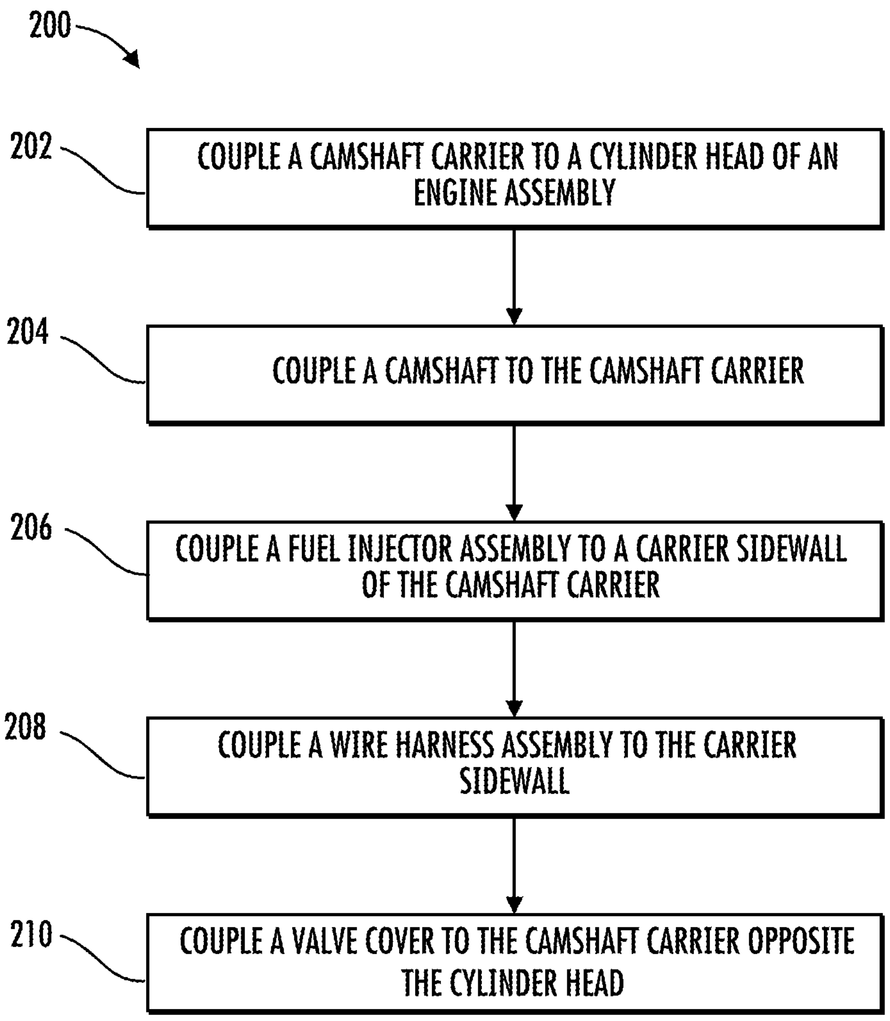
FIG. 7 is a flow diagram of a method of manufacturing an internal combustion engine that includes a camshaft carrier, according to an embodiment.

Referring to FIG. 7, a method 200 of manufacturing an internal combustion engine assembly is shown, such as the engine 100 and camshaft carrier assembly 104 of FIGS. 1A-1B and FIGS. 2-6, according to an embodiment. The method 200 includes coupling a camshaft carrier to a cylinder head of an engine in which the cylinder head defines at least one of an inlet passage or an exhaust passage therein. The method 200 also includes coupling a camshaft to the camshaft carrier so that the camshaft is disposed substantially within an interior cavity of the camshaft carrier. The method 200 further includes coupling a portion of a fuel injector assembly to the camshaft carrier by inserting a fuel injector of the fuel injector assembly through an opening in a carrier sidewall of the camshaft carrier, and fastening the fuel injector assembly to the camshaft carrier. In other embodiments, the method 200 can include additional, fewer, and/or different operations.

At operation 202, a camshaft carrier is coupled to a cylinder head of the engine. In some embodiments, operation 202 includes engaging a first carrier end of the camshaft carrier (e.g., a first carrier mounting flange) with a substantially planar mounting surface of the cylinder head, and/or a gasket or other seal member disposed between the camshaft carrier and the cylinder head. In some embodiments, operation 202 includes fastening a carrier sidewall of the camshaft carrier to the cylinder head along a perimeter of the carrier sidewall (and mounting surface of the cylinder head). For example, operation 202 can include inserting bolts through fastener openings in the carrier sidewall and tightening the bolts to sealingly couple the camshaft carrier to the cylinder head.

At operation 204, a camshaft is coupled to the camshaft carrier. In some embodiments, operation 204 includes placing the camshaft substantially within an internal cavity of the camshaft carrier. For example, operation 204 can include engaging the camshaft (e.g., camshaft journals, bearings, or bushings) with cam saddles formed into the camshaft carrier. Operation 204 can include fastening or otherwise coupling main bearing caps to the cam saddles to rotatably couple the camshaft to the camshaft carrier.

At operation 206, a fuel injector assembly is coupled to a carrier sidewall of the camshaft carrier. In some embodiments, operation 206 includes aligning the fuel injector assembly with an injector mount disposed on the carrier sidewall. Operation 206 can include coupling the fuel injector assembly to the camshaft carrier by inserting (e.g., pressing or otherwise engaging) a fuel injector of the fuel injector assembly through an opening in the carrier sidewall of the camshaft carrier, and fastening the fuel injector assembly to the camshaft carrier (e.g., to the at least one injector mount). In some embodiments, operation 206 includes coupling a plurality of fuel injector assemblies to the camshaft carrier.

At operation 208, a wire harness is coupled to the camshaft carrier. In some embodiments, operation 208 includes aligning the wire harness with a harness mount disposed on the carrier sidewall adjacent to the injector mount. Operation 208 can include pressing at least one wire of the wire harness assembly through the carrier sidewall, through a harness mount opening in the carrier sidewall. Operation 208 can include fixedly coupling the wire harness to the carrier sidewall by fastening, clipping, or otherwise coupling the wire harness to a harness connector along the carrier sidewall. In some embodiments, operation 208 includes coupling a plurality of wire harnesses to the camshaft carrier.

At operation 210, a valve cover is coupled to the camshaft carrier. In some embodiments, operation 210 includes engaging a valve cover mounting flange and/or surface with a second carrier end of the camshaft carrier opposite the first carrier end. Operation 210 can include fastening the valve cover to the carrier sidewall using bolts placed through the valve cover and into fastener openings defined by the carrier sidewall (and/or into the mounting surface of the cylinder head).

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, or with the two components, or the two components and any additional intermediate components being attached to one another.

The terms "fluidly coupled to" and the like, as used herein, mean the two components or objects have a pathway formed between the two components or objects in which a fluid, such as air, fuel, an gaseous fuel-air mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An engine system, comprising:
- a cylinder block;
- a cylinder head coupled to the cylinder block and defining at least one of an inlet passage or an exhaust passage therein;
- a camshaft carrier coupled to the cylinder head;
- a camshaft coupled to the camshaft carrier;
- a fuel injector assembly coupled to the camshaft carrier, a portion of the fuel injector assembly extending through a carrier sidewall of the camshaft carrier; and
- at least one wire harness coupled to the camshaft carrier, a portion of the at least one wire harness extending through the carrier sidewall of the camshaft carrier.

2. The engine system of claim 1, wherein the camshaft carrier comprises a plurality of cam saddles, the camshaft rotatably coupled to the plurality of cam saddles so as to enable rotation of the camshaft within the camshaft carrier.

3. The engine system of claim 2, further comprising a support sleeve coupled to and extending away from the carrier sidewall, the support sleeve separating regions disposed axially between the plurality of cam saddles from the cylinder head.

4. The engine system of claim 1, wherein the carrier sidewall defines: a first camshaft opening extending therethrough for viewing a first camshaft end of the camshaft, and a second camshaft opening extending therethrough for viewing a second camshaft end of the camshaft opposite the first camshaft end.

5. The engine system of claim 1, wherein the cylinder head includes a cylinder head sidewall, the carrier sidewall fastened to the cylinder head sidewall.

6. The engine system of claim 5, wherein an average thickness of the carrier sidewall is less than an average thickness of the cylinder head sidewall.

7. The engine system of claim 1, wherein the carrier sidewall defines an interior cavity of the camshaft carrier, the camshaft carrier further comprising a plurality of rocker arms fastened to the camshaft carrier and disposed within the interior cavity.

8. The engine system of claim 1, further comprising a valve cover fastened to the camshaft carrier, the camshaft carrier disposed between and separating the valve cover from the cylinder head.

9. The engine system of claim 1, wherein the cylinder head includes an intake side and an exhaust side opposite the intake side, the cylinder head defining the inlet passage extending through the intake side of the cylinder head, the fuel injector assembly coupled to the camshaft carrier adjacent to the intake side of the cylinder head.

10. The engine system of claim 9, wherein the camshaft carrier is engaged with and extends across a substantially planar surface of the cylinder head.

11. A camshaft carrier for supporting a camshaft on an engine, the camshaft carrier comprising:

a carrier sidewall defining an interior cavity, the carrier sidewall defining a plurality of injector mounts, the plurality of injector mounts each comprising:

an injector mount opening configured to receive a portion of a fuel injector assembly therethrough, and a fuel injector connector configured to couple the fuel injector assembly to the carrier sidewall;

a plurality of cam saddles coupled to the carrier sidewall and disposed within the interior cavity, the plurality of cam saddles configured to support the camshaft; and a plurality of rocker support tabs, at least one rocker support tab of the plurality of rocker support tabs defining a rocker mount opening configured to couple a rocker arm to the camshaft carrier.

12. The camshaft carrier of claim 11, wherein each of the plurality of cam saddles extend between a first sidewall portion of the carrier sidewall and a second sidewall portion of the carrier sidewall that is spaced apart from the first sidewall portion, the plurality of cam saddles defining bores that are coaxially aligned with one another.

13. The camshaft carrier of claim 12, further comprising a plurality of support struts, each of the plurality of support struts engaged with and extending away from a respective one of the plurality of cam saddles to the carrier sidewall.

14. A camshaft carrier for supporting a camshaft on an engine, the camshaft carrier comprising:

a carrier sidewall defining an interior cavity, the carrier sidewall defining a plurality of injector mounts, the plurality of injector mounts each comprising:

an injector mount opening configured to receive a portion of a fuel injector assembly therethrough, and a fuel injector connector configured to couple the fuel injector assembly to the carrier sidewall;

a plurality of cam saddles coupled to the carrier sidewall and disposed within the interior cavity, the plurality of cam saddles configured to support the camshaft, each of the plurality of cam saddles extending between a first sidewall portion of the carrier sidewall and a second sidewall portion of the carrier sidewall that is spaced apart from the first sidewall portion, the plurality of cam saddles defining bores that are coaxially aligned with one another; and a plurality of support struts, each of the plurality of support struts engaged with and extending away from a respective one of the plurality of cam saddles to the carrier sidewall, the plurality of support struts defining a plurality of through-hole openings, the plurality of through-hole openings each configured to receive a cylinder head fastener therethrough.

15. The camshaft carrier of claim 11, further comprising a support sleeve extending axially between adjacent cam saddles of the plurality of cam saddles, the support sleeve coaxially aligned with the plurality of cam saddles.

16. The camshaft carrier of claim 11, wherein the carrier sidewall defines a forward camshaft opening and a rear camshaft opening, the forward camshaft opening and the rear camshaft opening extending through the carrier sidewall, the forward camshaft opening and the rear camshaft opening coaxially aligned with the plurality of cam saddles.

17. The camshaft carrier of claim 11, wherein the carrier sidewall and the plurality of cam saddles are integrally formed from a single piece of material.

18. A method of assembly for an internal combustion engine, comprising:

coupling a camshaft carrier to a cylinder head of the engine, the cylinder head defining at least one of an inlet passage or an exhaust passage therein;

coupling a camshaft to the camshaft carrier so that the camshaft is disposed substantially within an interior cavity of the camshaft carrier;

coupling a fuel injector assembly to the camshaft carrier by inserting a portion of the fuel injector assembly through an opening in a carrier sidewall of the camshaft carrier, and fastening the fuel injector assembly to the camshaft carrier; and coupling at least one wire harness to the camshaft carrier so that a portion of the at least one wire harness extends through the carrier sidewall of the camshaft carrier.

19. The method of claim 18, wherein coupling the camshaft carrier to the cylinder head comprises engaging a first carrier end of the camshaft carrier with a substantially planar surface of the cylinder head and fastening the carrier sidewall to the cylinder head along a perimeter of the carrier sidewall, the method further comprising coupling a valve cover to a second carrier end of the camshaft carrier opposite the first carrier end.

* * * * *